United States Patent Office 3,365,407
Patented Jan. 23, 1968

3,365,407
WAX, POLYMER, WERNER COMPLEX COMPOSITION
Marc J. M. Bouvy and Raymond Mouneyrat, Nanterre, France, assignors to Shell Oil Company, New York, N.Y., a corporation of Delaware
No Drawing. Filed Sept. 4, 1963, Ser. No. 306,597
Claims priority, application France, Sept. 7, 1962, 908,887, Patent 1,340,327
3 Claims. (Cl. 260—28.5)

This invention relates to adhesive compositions. More particularly, it relates to adhesive compositions comprising a major proportion of wax to which is added a minor proportion of one or more Werner type complex compounds.

The use of Werner-type complexes is well known for a wide variety of applications wherein it is desired to render surfaces and/or materials hydrophobic. Thus, U.S. Patent 2,381,752 of Dec. 31, 1943, describes some aqueous compositions containing some protein material with the paraffin and some Werner type complex compounds; these compositions can be dried by evaporating the water which they contain. These compositions were intended to be used as adhesives or impregnating agents on paper, wood, textiles and other fibrous materials to give them hydrophobic properties. According to United States Patent 2,273,040 of Sept. 26, 1940, the paper thus treated and rendered hydrophobic by impregnation with a Werner type complex compound has a greater affinity for organic matter such as wax.

Moreover, Werner complexes have also been employed in polymeric materials such as polyacetal resins (U.S. Patent 2,410,414, issued Aug. 17, 1943). However, in each of the prior art applications, the complexes were used in conjunction with proteins and other materials having recognized pronounced adhesive properties.

The present invention, however, relates to the use of Werner-type complexes with wax, which is both non-proteinaceous, hydrophobic and essentially devoid of surface adhesive properties. The composition of the invention therefore consists of non-proteinaceous wax containing 0.05 to 2.0% by weight of at least one Werner type complex compound, which compositions have been found to be not only effective adhesives but simple and economical adhesives as well.

The expression "Werner type complex compound," which has already been used several times in this description, indicates those compounds, known for a long time, in which atoms of polyvalent metals are coordinately bonded to carboxyl groups. Some examples of these Werner complexes are given in the two United States patents previously cited and in United States Patents 2,410,414 (cited above), 2,544,666, 2,544,667 and 2,544,668 (Apr. 27, 1946), 2,597,721 (July 25, 1950) and 2,683,156 (June 18, 1951).

The Werner type complexes include, for example, the products corresponding to the following general formula:

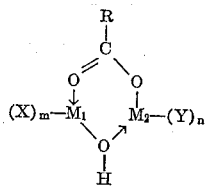

in which R is an organic group, preferably substituted or unsubstituted aliphatic, $M_1$ and $M_2$ are identical or different polyvalent metals, and X and Y are mineral acid residues, identical or not, while $m$ and $n$ are numbers such that $m = (\text{valence of } M_1 - 1)/(\text{valence of } X)$
$n = (\text{valence of } M_2 - 1)/(\text{valence of } Y)$ In the compositions of the invention, Werner complexes corresponding to this general formula are utilized preferably, especially those in which R is $C_nH_{2n+1}$ where $n$ is a whole number between 10 and 20, for example 15 or 17.

The polyvalent metals $M_1$ and $M_2$ are preferably identical. The best results are obtained with trivalent metals; chromium is preferred.

The X and Y groups are preferably halogen atoms such as chlorine or fluorine.

The waxes which are preferred in the composition of this invention are petroleum waxes referred to in the art as paraffin wax or as microcrystalline wax. Microcrystalline wax is also known as amorphous wax and is obtained by the dewaxing of residual lubricating oils while the paraffin waxes are usually obtained by the dewaxing of distillate lubricating oil fractions. Distillate paraffin waxes usually have melting points between about 120° F. and about 145° F., preferably between about 125 and 140° F. Microcrystalline waxes which contain only minor amounts of normal paraffins and largely predominate in highly branched and naphthenic waxes have melting points in the order of 130–160° F., usually between 140 and 150° F.

The higher melting point paraffin waxes are especially useful in many coating compositions: heavy distillate waxes obtained from the highest boiling distillate lubricating oil fractions by dewaxing have melting points in the order of 145 and 185° F., as does the high melting point paraffin wax split from microcrystalline wax by fractional crystallization.

Special waxes may be obtained in particular instances, such as the plastic wax obtained by the deoiling of soft wax fractions which normally are separated from paraffin waxes during deoiling and dewaxing procedures. These plastic waxes are useful for their extreme flexibility.

It is normal experience in designing wax compositions to find it necessary to combine several waxes together in a single composition. The purpose of this, of course, is to obtain the beneficial properties inherent in each particular type of wax or to minimize adverse properties of other waxes so included.

The amount of the Werner type complex compound present in these compositions should be between 0.05 and 2% by weight, calculated on the weight of the paraffin and/or wax. In general, it is preferable to use quantities such that the composition is stable to sedimentation. Preferably this quantity is between 0.1 and 1% or, better, between 0.1 and 0.5% for example 0.2% by weight, quantities with which excellent results have been obtained.

The compositions of this invention have proved extremely useful as adhesives for gluing very diverse materials, especially those of a fibrous nature such as paper, wood, natural or artificial textiles, etc. These materials can be glued not only to each other but also to materials of an entirely different nature, for example, metals, plastic materials such as polyethylene, polypropylene, polyvinyl chloride, polyesters (for example, derivatives of terephthalic acid), etc.

These compositions are very advantageous for gluing materials which are in the form of sheets and are especially useful as an antigluing agent for sheets of paper and metal i.e., maintains the sheet of paper glued to the sheet of metal on one side of the paper while the other side of the sheet of the paper is released from adherent contact with articles wrapped therein.

These assemblages, such as aluminum-paper sheets, are frequently used as packing materials for greasy substances such as butter, margarine, cheese, etc.

Such a packing material must satisfy fairly severe requirements. Thus, when the product is unpacked, the two parts of the assemblage should remain glued to each other, especially if the product has been kept for a certain time in a humid place, such as a refrigerator or a cold room.

If a packing material made from paper and a metal sheet, such as a sheet of aluminum, is used for the above purpose, it sometimes happens that, on unwrapping the greasy product, the paper is detached from the metal and remains glued to the product. More often, this detachment is not complete, with the result that some paper remains glued to the product in places, which is fairly difficult to detach.

In order to surmount this difficulty, a proposal has already been made to use a packaging material prepared from paper which has been pretreated with a Werner type complex compound and then glued to an aluminum sheet with the aid of paraffin or wax.

A material thus prepared, although giving satisfactory results, still presents certain inconveniences, especially in its preparation. It is necessary, in effect, to start with paper pretreated in a very special way which already makes it very expensive and which, in addition, causes the risk to the manufacturer of the said packaging material of a shortage of such paper. The use of a composition given by the present invention surmounts these difficulties and risks.

With the aid of one of these compositions, every kind of paper (even that not especially treated) can be glued to sheets of a metal such as aluminum.

Since the Werner type complex compounds are very often highly colored products, the invented compositions are also very frequently colored lightly, but distinctly, so that the manufacturer of the packaging material could not confuse the wax or paraffin of the glue specified in this invention with an ordinary wax or paraffin.

The compositions of this invention containing the preferred Werner type complex (derivatives of chromium have a strong green color) have a fairly distinct green color. The compositions used for the special usage described above are preferably non-aqueous compositions.

It is possible to add to these compositions other ingredients usual in such compositions, such as antioxidants, coloring agents, dispersing agents, etc. These products are generally present in quantities of 0.001 to 5% by weight, based on the wax.

It is not only possible but preferred to add to these compositions organic polymeric products, such as polyvinyl chloride, polyethylene (Ziegler type or "high pressure" type), polypropylene, various rubbers (natural, styrene-butadiene, butyl, ethylene-propylene copolymer), etc.

The organic polymers preferred for the compositions of the invention are addition polymers, that is, those which are formed by addition at the double bonds of the monomer. Particularly preferred polymers are those produced from monoolefins (e.g., ethylene, propylene), diolefins (e.g., butadiene and isoprene), or vinyl compounds

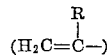

such as vinyl chloride, methyl methacrylate, vinyl acetate, styrene and the like. The organic polymer to be used in accordance with the invention should have an average molecular weight of between about 10,000 and 2 million (per light scattering technique) and preferably between about 20,000 and 800,000.

It is preferable to use the polymeric products in proportions between 0.1 and 10% or, even better, between 1 and 5%, as, for example, 3% by weight calculated on the weight of the wax and/or paraffin.

The invention is illustrated by the following example.

EXAMPLE

A packaging material is prepared by gluing an ordinary, unpretreated paper to an aluminum sheet having a thickness of 9 to 10 microns by means of a wax composition containing: 96.8% of a microcrystalline wax; 3.0% butyl rubber (average mol wt. about 100,000); 0.2% of a product of the formula:

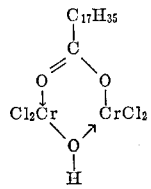

Some butter was wrapped in this material and kept thus packaged in a cold room for seven days, followed by two days at 20° C. and 60% relative humidity. After these periods, the butter (200 packages of 50 grams each) was unpacked. All the packages were easily unwrapped, with no paper remaining glued to the butter.

We claim as our invention:

1. An adhesive petroleum wax composition consisting essentially of 94–98.9% by weight petroleum wax, 1–5% by weight of butyl rubber having an average molecular weight of between about 20,000 and 800,000, and 0.1–1% by weight of a complex having the formula:

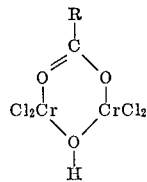

wherein R is a $C_{10-20}$ alkyl radical.

2. A composition in accordance with claim 1, wherein the petroleum wax is microcrystalline wax and wherein the alkyl radical R of the complex compound is $C_{17}H_{35}$.

3. A composition in accordance with claim 1 which consists essentially of 96.8% by weight microcrystalline wax, 3% by weight butyl rubber and 0.2% by weight of the complex compound wherein the R radical is $C_{17}H_{35}$.

References Cited

UNITED STATES PATENTS

| 2,381,752 | 12/1943 | Iler | 106—125 |
| 2,410,414 | 11/1946 | Johnson | 20—89 |
| 2,753,275 | 7/1956 | Wiles et al. | 117—64 |
| 3,061,493 | 10/1962 | Anderson | 154—50 |
| 3,117,101 | 1/1964 | Moyer | 260—28.5 |

OTHER REFERENCES

Warth: "The Chemistry and Technology of Waxes," 2nd edition, Reinhold Publishing Corp., N.Y., 1956, pp. 636–640, 728, 801.

Nauserman: Chromium Complexes, 1959, American Chemical Society, p. 355.

MORRIS LIEBMAN, *Primary Examiner.*

J. A. GAZEWOOD, H. S. KAPLAN,

*Assistant Examiners.*